Jan. 3, 1950     L. J. CAREY     2,493,527
WIPER DRIVE ARM
Filed May 23, 1946     2 Sheets-Sheet 1
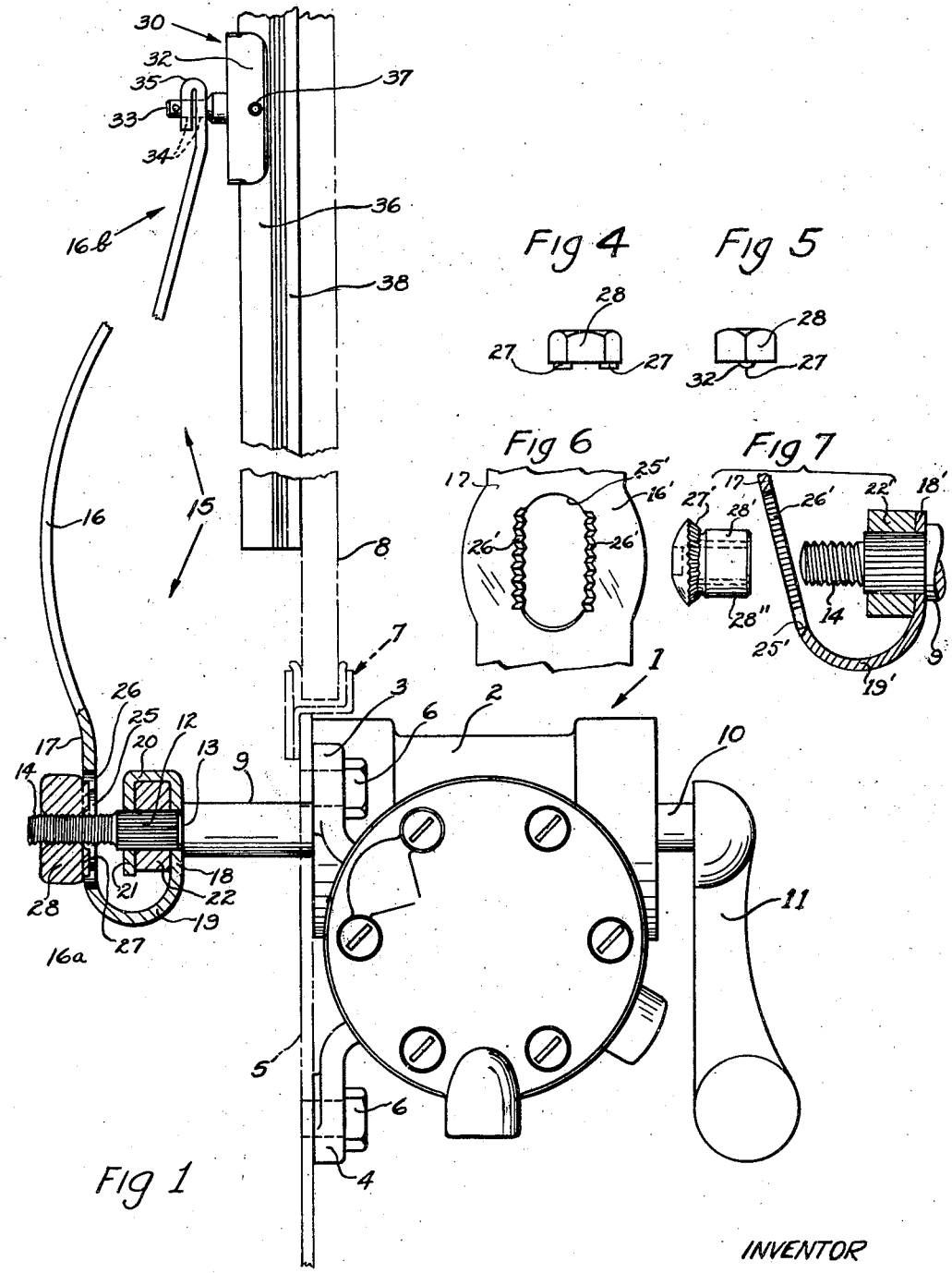
INVENTOR
LEROY J. CAREY
BY George M Soule
ATTORNEY

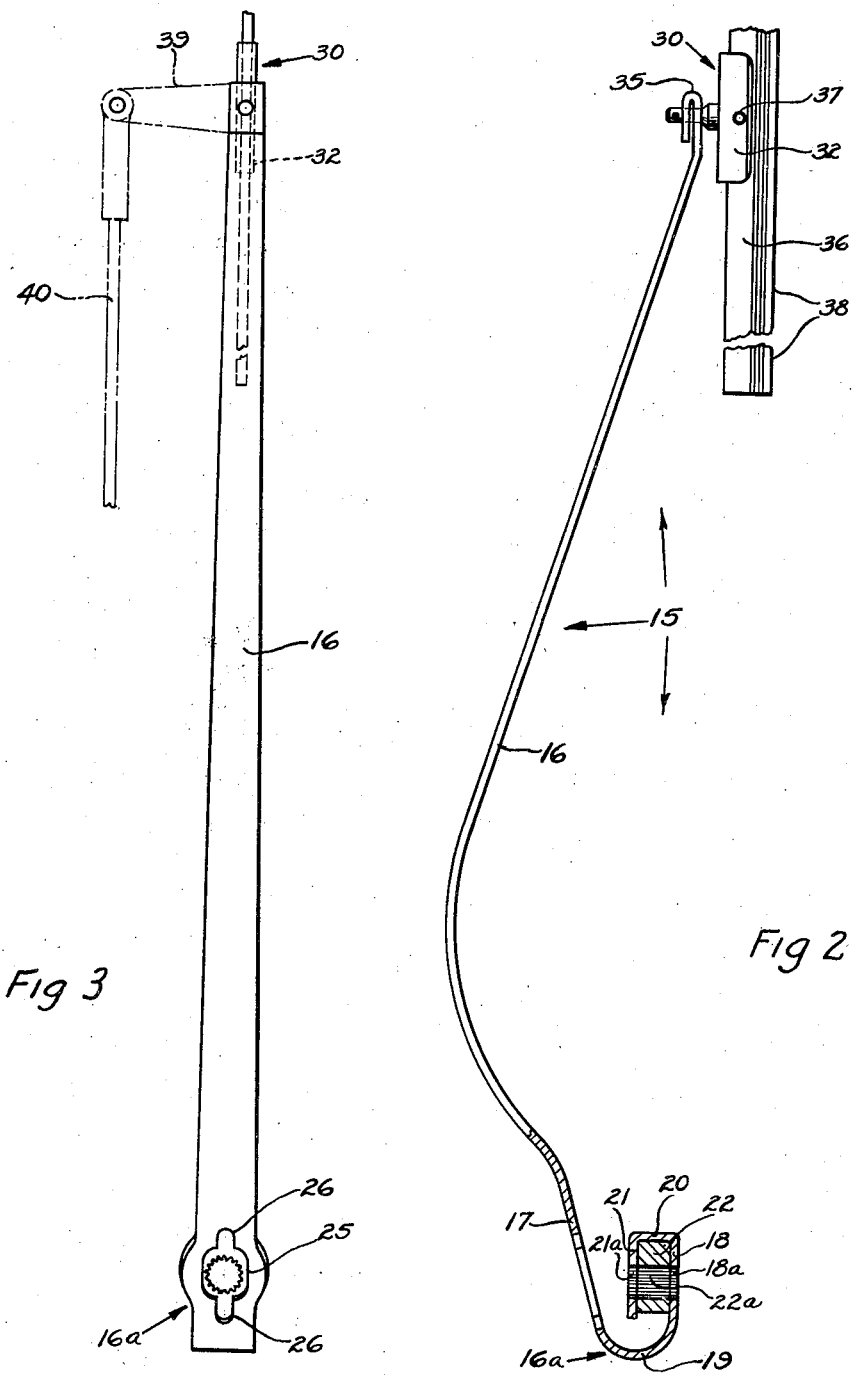

Patented Jan. 3, 1950

2,493,527

UNITED STATES PATENT OFFICE 2,493,527

WIPER DRIVE ARM

Leroy J. Carey, Cleveland, Ohio, assignor to The Marquette Metal Products Company, Cleveland, Ohio, a corporation of Ohio Application May 23, 1946, Serial No. 671,728

7 Claims. (Cl. 287—53)

This invention relates to a drive arm for wiper mechanisms such as represented by windshield wiping equipment on automobiles, airplanes and other vehicles.

An object is to provide a simplified and otherwise improved drive arm for such purposes and an improved method of making the same.

A specific object is to provide a simplified wiper drive arm having an easily operated means for adjusting the force by which the drive arm holds a wiper element such as a squeegee blade against the surface to be wiped.

A specific object is to provide a wiper drive arm which may be formed almost entirely from a single piece of sheet or strip metal and afford both a splined connection to a drive shaft and a force varying adjustment for increasing and decreasing the wiping pressure of the blade or wiping element on the surface to be wiped.

A further specific object is to provide an improved and simplified wiper drive arm head connection to a drive shaft.

Another object is to provide a wiper drive arm comprising principally a single strip of spring metal having an open loop at one end and cooperating means affording a spring stress adjustment retaining device for varying the pressure of the wiper blade on the surface to be wiped and further having spaced looped portions adapted to have aligned openings therein for snugly receiving complementary portions of a drive shaft in order to secure the drive arm firmly on the drive shaft and key the arm thereto against rotation relative to the shaft.

Another object is to provide a wiper drive arm spring adjustment retaining device in the nature of a threaded nut cooperable with an apertured spring portion of the arm and having locking means engageable with said portion of the arm in different adjustments of the nut to vary the pressure of a wiper blade carried by the arm against the surface to be wiped.

Other objects and features of the invention will become apparent from the following description of the preferred form shown in the accompanying drawings. The essential characteristics are defined in the claims.

In the drawings:

Fig. 1 is a fragmentary side elevational assembly view showing a wiper drive arm operating mechanism, portions of the drive arm (partly in central section) and an illustrative type of wiper blade connected to the outer end of the arm;

Fig. 2 is a similar side elevational view of the drive arm, the head portion thereof being shown in section as in Fig. 1 and detached from the drive shaft;

Fig. 3 is a front view of the drive arm, i. e. taken at right angles to Fig. 2;

Figs. 4 and 5 are side elevational views, at right angles to each other, showing the preferred form of securing nut for the drive arm assembly;

Fig. 6 is a fragmentary view similar to the lower portion of Fig. 3, showing a modification of that part of the drive arm; and Fig. 7 is an exploded view of the modified form of drive arm and attaching nut, the drive arm portion shown being in central cross section as in Fig. 1.

Referring to Fig. 1, the driving motor assembly 1 may comprise a fluid operated reciprocating type motor such as shown in my copending application Serial No. 668,431, filed May 9, 1946, entitled "Fluid operated motor mechanism." As there shown, the motor housing 2 has suitable brackets 3 and 4 adapted for attachment to a vehicle portion, such as diagrammatically indicated at 5, as by attaching bolts or studs partially shown at 6. Adjacent the vehicle portion 5 is a framework, one portion of which, indicated at 7 in Fig. 1, supports a transparent panel 8 a portion of the surface of which is to be wiped. The panel 8 may be the usual windshield or front transparent portion of the vehicle body.

As described in said application, the housing 2 contains mechanism for effecting oscillatory movement of a drive shaft such as 9 hereof projecting from the housing through the body portion 5 for supporting and operating the wiper drive arm through a predetermined angular movement necessary to clear the desired portion of the panel 8. The mechanism may include a shaft extension 10 and manual operating handle 11 by which the drive shaft 9 may be turned by hand in event of power failure.

For supporting and operating the wiper drive arm, the drive shaft 9 is provided with a noncircular (e. g. spline-serrated) portion such as 12 forwardly beyond a shoulder 13 and, therebeyond, the shaft is further reduced in diameter and threaded as at 14 for receiving an attaching nut 28 as will be more fully described later.

The drive arm assembly 15 comprises a main body portion 16 formed of sheet or strip metal, having or being capable of treatment to obtain suitable spring characteristics. The arm normally (i. e. when detached from the shaft), as shown by Fig. 2, has a somewhat different shape than it does after being fully mounted on the shaft. The metal strip comprising the body 16 may, as shown by Fig. 3, be gradually tapered from its mounting head portion 16a toward the opposite blade carrying portion 16b.

The mounting head portion 16a of the strip 16 is in the form of an open loop comprising spaced apart portions 17 and 18 connected by a curved spring portion 19 and, additionally, the metal at the shank end of the strip has, as shown, a further return bend comprising portions 20 and 21. The portions 18 and 21 are parallel to each other and spaced apart a considerable distance along the shaft. In order to stabilize the shaft mounting portions 18, 20 and 21, a metal filler block 22 may be secured between the parallel head portions 18 and 21 in face to face contact with the portions 18, 20 and 21. The filler block may be welded or otherwise secured in place in any suitable manner. The filler block, or one of the portions 18 and 21 or all three, has or have its or their openings formed complementary to the spline serrations 12 of the drive shaft. In Fig. 2, the spline-serrated openings 18a, 21a and 22a in respective elements 18, 21 and 22 are illustrative of the preferred arrangement.

The portion 17 of the drive arm is provided with an elongated opening 25 sufficiently large easily to receive the threaded portion 14 of the drive shaft without contact therewith in any outwardly or inwardly sprung position of the portion 17, and diametrically opposite portions of the elongated opening 25 are extended as at 26 for cooperation with locking lugs 27 of the nut 28. Prior to assembly of the head portions 17—21 of the drive arm on the shaft, the portion 17 springs away from the assembly 18—22 about as shown in Fig. 2 and, with said assembly on the serrations 12 of the shaft fully seated against the shoulder 13 thereof, the outer end of the arm would be normally a considerable distance from the panel 8 with the wiper blade assembly 30 out of contact with said panel. Since the assembly 18—22 provides a firm anti-rotational bearing support on the shaft, the outer end of the arm may then be forced, as by hand, to bring the wiper assembly against the panel 8 and then the nut 28 can ordinarily be turned on the threads of the portion 14 of the shaft approximately to final position without the use of a wrench.

The lugs 27 of the securing nut 28 (Figs. 4 and 5) are preferably identical and disposed diametrically of the threaded opening of the nut, being generally complementary in cross section to the elongated extensions 26 of the opening 25. Preferably the lugs are rounded on their sides as indicated at 32, Fig. 5, so that they may act as cams against the edges of the opening extensions 26, enabling the final pressure adjustment of the drive arm to be effected as by means of a wrench without having otherwise to apply pressure against the drive arm toward the panel 8. The lugs may, if desired, have parallel sides for more positive anti-rotational locking engagement with the opening portions 26 since it is easy enough to flex the drive arm by hand to the relative position of loop portions 17, 18 shown by Fig. 1. The cam form of lug illustrated by Fig. 5 is adequate to prevent accidental rotation of the nut because once the wiper is in contact with the panel 8 there is always considerable spring pressure retained by the nut in the spring loop portions 17—18 of the drive arm. The number of opening extensions 26 and the number of locking lugs on the nut may be increased or diminished.

The illustrative arrangement of blade assembly shown comprises a saddle piece 32 having a pivot pin 33 passing through aligned apertures 34 in the doubled or folded terminal portion 35 of the drive arm body 16. The saddle usually has a limited floating connection with the rigid backing strip 36 of the blade assembly including an attaching pivot indicated at 37. The portion 38 of the blade assembly is usually rubber or other readily flexible material.

When the saddle is pivotally mounted on the drive arm as illustrated, then it is necessary to provide a guide rod or pantograph mechanism for connection of the saddle piece to some portion of the vehicle to prevent the blade from swinging out of the desired wiping positions. Part of such a blade positioning linkage is diagrammatically illustrated in Fig. 3, comprising an arm 39 rigid with the saddle piece 32 and a link 40 secured to the outer end of the arm 39 and pivotally attached to the vehicle as at one side of the drive shaft.

In making the drive arm, the operations of forming the head portions 18, 20 and 21; welding of the filler block 22 into place and finish forming of the spline-serrated openings 18a, 21a and 22a are preferably accomplished before the return bend or loop 19 is formed in the strip stock of the body 16. All the openings mentioned can be finish formed as a single broaching operation. The opening 25 is preferably punched in the strip stock while still flat or at least before forming the spring loop at 19. Since the opening 25 loosely surrounds the threaded portion 14 of the shaft, the loop 19 does not have to be held within very close manufacturing tolerances. That is of considerable advantage because the strip stock is more or less subject to deformation during the spring tempering process. The fold 35 in the strip stock at the outer end of the drive arm is done before the bearing openings 34 for the saddle pivot are formed. Approximate curving or other shaping of the strip 16 between the head portion 16a and blade mounting portion 16b may be done at any time prior to tempering. Spring tempering of the strip stock is usually a final operation.

While the wiper drive arm hereof, as preferably formed, comprises principally a single piece of strip metal, more than one piece can be used as an assembly without sacrifice of the operational advantages described herein. For light duty service the filler block 22 can frequently be omitted to save cost.

Referring to Figs. 6 and 7, the elongated opening 25', corresponding to the opening 25 of Fig. 3, is serrated on opposite longer sides as at 26' for camming and locking engagement with converging serrations 27' on the nut 28'. Said nut has a reduced diameter cylindrical portion 28'' adapted to extend loosely through the elongated opening at 25' for engagement with the threaded portion 14 of the drive shaft 9. When the nut is screwed onto the threads a predeterminable distance necessary to cause mutual engagement of the teeth 26' and 27', the spring loop portion 19' of the drive arm is contracted and the interengaging teeth enable adjustment of the nut in and out along the threaded portion of the drive shaft, while maintaining the nut against accidental movement out of place. The rounded end face of the nut has provision for engagement by a suitable tool, i. e. end wrench or screw driver. In adjusted position, the head of the nut lies substantially flush with the forward face of the spring portion 17 of the arm. The teeth 26' and 27' are operatively complementary although the tooth faces do not absolutely match.

Fig. 7 also illustrates omission of the portion 21 (Fig. 2) of the drive arm. The portion 18' of the spring loop 19 in Fig. 7 is welded to the interiorly serrated block 22' fitting the serrated portion of the drive shaft as previously described.

I claim:

1. In a wiper drive arm, an arm member comprising a single piece of sheet metal having an open loop at one end, one portion of the loop having an opening adapted to receive a portion of a drive shaft for enabling mounting of the arm rigidly on such shaft, a spring portion of the loop in spaced relation to the first portion and extended to constitute a wiper-supporting spring arm, and attaching means constituting a wiper force regulating means operatively engaging the spring portion adjustably to force the spring portion toward the shaft-receiving portion.

2. A wiper drive arm in the form of a metal strip having a head portion adapted to support a wiper on a drive shaft, said head portion having an open spring loop providing spaced sides, one side having a non-circular opening for fitting over a non-circular portion of the drive shaft and the other side being free and adapted to support a wiper, said other side having an opening for loosely receiving a different axially spaced portion of the shaft, and cooperating attaching means adjustably engaging the second portion of the shaft and operatively bearing on the wiper-supporting side adjustably to force the same toward the first-mentioned side.

3. In a wiper drive arm, a mounting head for attachment to a drive shaft having a non-circular portion and a threaded free end portion, said head comprising a strip of metal adapted to carry a wiper and having an opening arranged loosely to receive the free end portion of the shaft so that a nut threaded on said end portion can apply pressure to the strip around the opening, said strip having two contiguous relatively reversely bent portions each apertured to provide spaced bearing portions for receiving the shaft, and means carried by one of said spaced bearing portions arranged to engage such non-circular portion of the shaft drivingly to connect the head to the shaft for swinging movement of the drive arm thereby.

4. In combination with a wiper drive shaft having a non-circular shank portion and a threaded free end portion, a wiper drive arm having a mounting head for attachment to the drive shaft, said head comprising a strip of spring metal adapted to carry a wiper and having an opening arranged loosely to receive the free end portion of the shaft so that a nut threaded on said end portion can apply wiper-force-adjusting pressure to the strip around the opening, said strip having two contiguous relatively reversely bent portions each apertured to provide spaced bearing portions for receiving the shaft, one of the apertures being non-circular to form a driving connection with such non-circular portion of the shaft.

5. In combination with a wiper arm drive shaft having a non-circular portion and a threaded free end portion, a drive arm having a mounting head portion of sheet metal formed into an open loop, one portion of the loop having means rigid therewith fitting the non-circular portion of the drive shaft, a spring portion of the loop being extended beyond the shaft for carrying a wiper, said spring portion having an aperture freely receiving the threaded portion of the shaft, a nut on said threaded portion bearing against said spring portion of the loop, and coacting means on the spring portion and the nut for locking the nut in adjusted position.

6. The combination according to claim 5, wherein said coacting means comprises a radial extension of the aperture in the spring portion of the loop and a lug on the nut adapted to seat in said extension of said aperture.

7. In a wiper drive arm having a mounting head including a metal leaf spring portion with an elongated aperture adapted to loosely surround a threaded portion of a drive shaft while enabling angular movement of the spring portion with reference to the axis of such shaft, said aperture having a series of teeth on one side with sloping faces in relatively intersecting planes, and an attaching nut for the drive arm adapted to enter the aperture for contact with the shaft threads, said nut having a head portion with a circular arrangement of teeth operatively complementary to the teeth of said spring portion of the drive arm.

LEROY J. CAREY.

REFERENCES CITED

The following references are of record in the file of this patent:

UNITED STATES PATENTS

| Number | Name | Date |
|---|---|---|
| 752,628 | Miner | Feb. 16, 1904 |
| 860,393 | Lees | July 16, 1907 |
| 1,569,412 | Waters | Jan. 12, 1926 |
| 1,872,051 | Watts | Aug. 16, 1932 |
| 1,928,044 | Andres et al. | Sept. 26, 1933 |